United States Patent [19]

Schmitkons et al.

[11] Patent Number: 5,733,379
[45] Date of Patent: Mar. 31, 1998

[54] METHOD FOR CLEANING A MIXER

[75] Inventors: James W. Schmitkons, Lorain; Richard P. Price, Parma Hts., both of Ohio

[73] Assignee: Nordson Corporation, Westlake, Ohio

[21] Appl. No.: 542,033

[22] Filed: Oct. 12, 1995

Related U.S. Application Data

[63] Continuation of Ser. No. 296,539, Aug. 26, 1994, abandoned, which is a continuation of Ser. No. 640,043, Jan. 11, 1991, abandoned.

[51] Int. Cl.$^6$ .................. B08B 7/04; B08B 9/02
[52] U.S. Cl. .................. 124/19; 134/22.1; 134/22.11; 134/30; 134/35; 134/36; 222/148
[58] Field of Search .................. 134/19, 22.1, 22.11, 134/22.17, 22.18, 22.19, 34, 30, 35, 36, 38, 40; 222/148

[56] References Cited

U.S. PATENT DOCUMENTS

| | | | |
|---|---|---|---|
| 3,026,183 | 3/1962 | Cole, III | 422/135 |
| 3,119,720 | 1/1964 | Stiles et al. | 134/22.19 |
| 3,457,108 | 7/1969 | Hittel | 134/22.17 |
| 3,776,774 | 12/1973 | Miller | 134/7 |
| 3,806,030 | 4/1974 | Svensson | 239/112 |
| 3,865,628 | 2/1975 | Callahan et al. | 134/2 |
| 4,485,840 | 12/1984 | Erwin | 222/148 |
| 4,522,504 | 6/1985 | Greverath | 366/339 |
| 4,549,676 | 10/1985 | Gerich | 222/148 |
| 5,012,839 | 5/1991 | Rogers et al. | 137/341 |
| 5,318,637 | 6/1994 | Wernicke | 134/22.11 |

FOREIGN PATENT DOCUMENTS

| | | |
|---|---|---|
| 62-27127 | 2/1987 | Japan . |
| 0929998 | 6/1963 | United Kingdom . |
| 0981021 | 1/1965 | United Kingdom . |

*Primary Examiner*—Jill Warden
*Assistant Examiner*—Saeed Chaudhry
*Attorney, Agent, or Firm*—Wood, Herron & Evans L.L.P.

[57] ABSTRACT

A method for purging cured and partially cured material from a mixer employed in a system for dispensing two-component reactive polymeric materials, includes, in one aspect, the introduction of a pulsed flow of a flushing material into the mixer to purge partially cured two-component mixture from the mix and thus delay the onset of plugging of the mixer, and, in a second aspect, includes heating the mixer to a temperature between the application temperature and decomposition temperature of the cured components and then introducing flushing material at high hydraulic pressure to discharge cured material from the mixer.

5 Claims, 3 Drawing Sheets

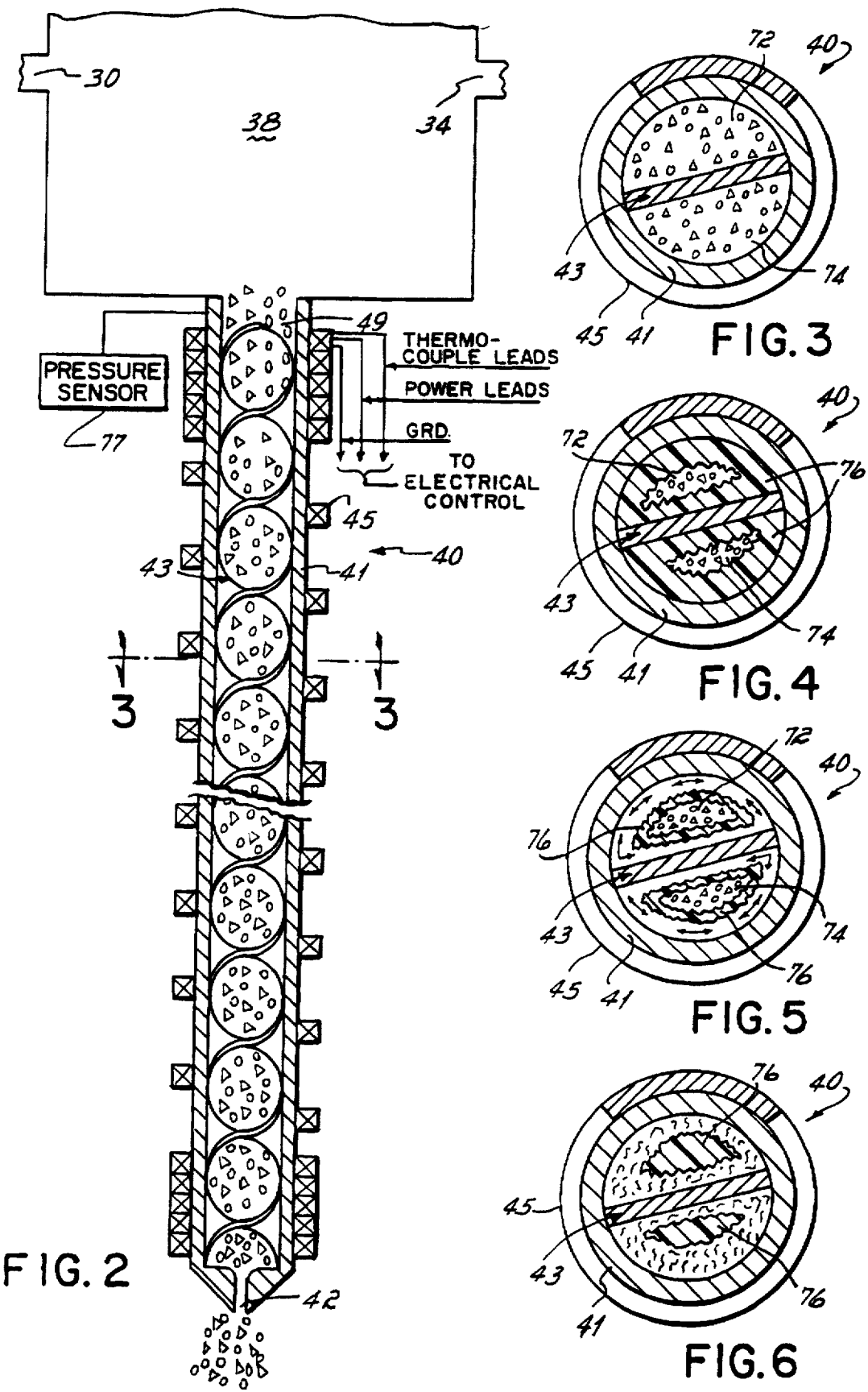

METHOD FOR CLEANING A MIXER

This application is a continuation of prior application Ser. No. 08/296,539 filed Aug. 26, 1994 entitled "METHOD AND APPARATUS FOR CLEANING A MIXER" now abandoned, which is a continuation of Ser. No. 07/640,043 filed Jan. 11, 1991, now abandoned.

FIELD OF THE INVENTION

This invention relates to mixing and dispensing systems, and, more particularly, to the method and apparatus for purging cured and partially cured materials from the mixers employed particularly in two-component mixing and dispensing systems.

BACKGROUND OF THE INVENTION

Two-component polymeric materials such as reactive adhesives, paints, gasket materials, and caulking materials comprise two separate components which react chemically with one another when intermixed. For example, two-component hot melt polymeric materials used in adhesive applications include a polymeric material and a second material such as a hardener. These types of hot melt adhesives, and other two-component polymeric materials, are dispensed from a system in which the two components are supplied in a predetermined ratio to a mixer/dispenser where the components are intermixed with one another before they are dispensed onto a substrate.

One problem with two-component systems is that the materials tend to cure within the mixer/dispenser, particularly when they are dispensed intermittently, and these cured materials can plug the mixer entirely and/or significantly reduce its mixing efficiency much like arteriosclerosis causes problems with the flow of blood through the arteries and heart. In "cold" or ambient temperature, two-component systems, one solution to this plugging problem has been to employ relatively inexpensive, disposable mixers which can be thrown away when they become clogged. One problem with this solution is that the system must be shut down while the clogged mixer is removed and a new one is placed on-line. In addition, mixers of this type are usually formed of plastic materials which would not be serviceable for mixing two-component hot melt adhesives or other elevated temperature, two-component systems because of the relatively high temperatures to which such materials must be heated before they are converted from solid to liquid state for dispensing.

Another solution which has been proposed for use in dispensing cold or ambient temperature two-component systems is to employ mixers formed of stainless steel or other non-disposable materials which can withstand relatively high temperatures. When these types of mixers become clogged with cured two-component materials, it has been common practice to remove the mixer from the dispensing system and heat it in a furnace at a temperature at least equal to the decomposition temperature of the cured material. At such temperatures, the cured material oxidizes leaving a relatively small quantity of ash which can be removed before the mixer is placed back in the dispensing system.

One problem with cleaning cured two-component hot melt adhesive from stainless steel or similar essentially permanent mixers with the method described above is that it can be a time consuming operation. Decomposition temperatures for two-component hot melt adhesives, for example, can be on the order of 900° F. to 1000° F. A relatively long period of time is needed to first remove the mixer from the dispensing system, heat it to such decomposition temperatures, and then cool the mixer back down to a temperature where it can be handled and reinserted into the dispenser system.

SUMMARY OF THE INVENTION

It is therefore among the objectives of this invention to provide a method and apparatus for purging or removing cured and partially cured two-component material from the mixer of two-component dispensing systems, which delays the onset of plugging of the mixer and which minimizes the time and effort associated with purging the mixer.

It has been found that two-component reactive polymeric materials, such as highly viscous hot melt polymeric materials, invariably cure within the mixers employed in two-component dispenser systems and eventually constrict and plug the flow passages through such mixers. As used herein, the term "cure" is meant to refer to the process in which two polymers cross link with one another. One aspect of this invention is predicated upon the concept of delaying the onset of plugging of the mixer, particularly when the dispensing system is operated intermittently, by purging partially cured material from the mixer which has begun to solidify but has not yet adhered to the internal walls of the mixer. Another aspect of this invention involves efficiently purging or flushing cured polymeric materials from the internal walls of the mixer, with the mixer on-line in the dispensing system, once the mixer eventually becomes plugged.

Two-component dispensing systems generally include two separate valves, each of which introduces one component into the mixer/dispenser where they are combined and then dispensed onto a particular substrate. In the practice of the method of this invention, one of the component applicators is shut off, and the applicator for the other component is utilized for the purging operations. If hot melt polymeric materials are being dispensed through the system, for example, the high volume polymeric material is used as the flushing material to perform the purging operations.

In one aspect of this invention, it has been found that improved flushing or purging of partially cured material from the mixer is obtained by pulsing the flow of flushing material into the mixer. For example, a quantity of flushing material is introduced into the mixer for a period of about two seconds, and then the flow is discontinued for a two second interval. During the time when the flow is stopped, the flushing material within the mixer is allowed to come to rest or at least flow at a slower rate. When flow of the flushing material is resumed, the flushing material present within the mixer has a higher effective viscosity because it was allowed to come to rest or at least flow more slowly within the mixer. As a result, increased shear stresses are applied by the flushing material within the mixer to the two-component reactive materials which had partially cured therein during operation of the system. This partially cured two-component reactive material, or at least a part of it, is transmitted by the pulsed, flushing material out of the mixer during this flushing operation in preparation for resumption of the dispensing operation.

The aforementioned pulsed, flushing operation employed in one aspect of this invention is effective to delay the onset of plugging of the mixer, but despite this flushing operation the mixer eventually will become constricted or plugged with cured material to a degree that the two components cannot be effectively combined with one another. This condition is determined by sensing the pressure drop across the mixer with a suitable, commercially available pressure sensor. When the pressure drop exceeds a predetermined level, the second aspect of this invention is employed to remove the cured material from the internal walls of the mixer.

In the presently preferred embodiment, a heating coil is affixed to outside of the mixer which is capable of heating the mixer walls to a temperature between the application temperature of the polymeric materials introduced into the mixer and the decomposition temperature of such materials. The term "walls" as used herein is meant to refer to the outer wall of the mixer as well as the internal mixing elements employed to combine the two components together, all of which are constructed of stainless steel or other thermally conductive material. These walls are effective to rapidly transfer the heat from the heating coil throughout the mixer, and such heat transfer occurs much more rapidly than through the layer or coating of cured reactive materials which had adhered to the mixer walls during the dispensing operation. As a result, the outermost portion of the layer of the cured material which contacts the mixer walls become relatively quickly heated, while the temperature at the center of such cured layer is comparatively low.

Once this temperature gradient across the layer of cured material is obtained, a purging material such as one of the components of the two-component material is introduced at high hydraulic pressure into the interior of the mixer. At high pressure, the flushing or purging component is effective to apply a high shear force to the cured material. This shear force is further increased by introducing the purging component into the mixer at low temperature, i.e., compared to the temperature of the mixer, such that the flushing material is highly viscous. Because the temperature of the cured material is highest at the mixer walls, its shear strength is lowest at that location and therefore failure of the layer of cured material occurs at the mixer walls allowing it to break free. After the layer of cured material has been dislodged from the mixer walls by the purging component, the cured material is transmitted by the purging component out of the mixer.

The aforementioned heating and flushing operation is accomplished on-line without removing the mixer from its position in the dispenser system. Because the mixer is heated to a temperature between the application temperature and decomposition temperature of the two-components, it takes less time to raise the temperature of the mixer to that level and then cool it to a point where operation of the system can be resumed, compared to other methods which heat and maintain the mixer at the decomposition temperature to perform the purging operation. The speed and efficiency of the purging operation is therefore improved with the method of this invention in two respects, i.e., the mixer can remain in place in the system during the purging operation, and the mixer can be heated to a lesser temperature and still be effectively purged.

DESCRIPTION OF THE DRAWINGS

The structure, operation and advantages of the presently preferred embodiment of this invention will become further understood upon consideration of the following description, taken in conjunction with the accompanying drawings, wherein:

FIG. 2 is a cross-sectional view of the static mixer in the system of FIG. 1;

FIG. 3 is a cross-sectional view taken generally along line 3—3 of FIG. 2 illustrating the static mixer in a condition where it is completely cleared of cured material;

FIG. 4 is a view similar to FIG. 3 except after a period of operation of the mixer where a layer of cured material has collected on the mixer walls;

FIG. 5 is a view similar to FIGS. 3 and 4 except after the application to heat to the static mixer, and after the introduction of flushing material therein to dislodge the cured material;

FIG. 6 is a view similar to FIG. 5 wherein the cured material is transmitted out of the static mixer by the purging material.

DETAILED DESCRIPTION

Figure 1:
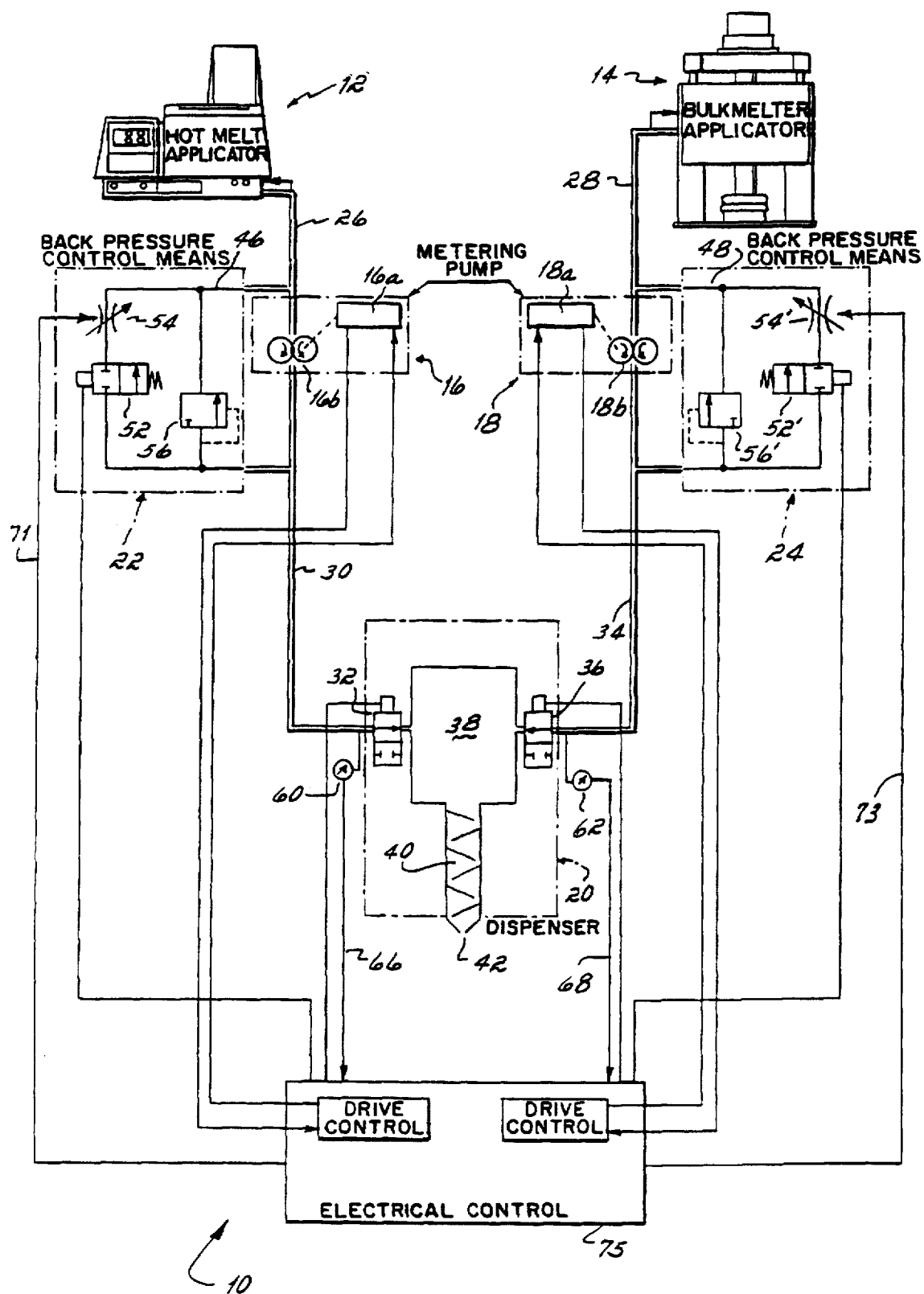
FIG. 1 is a diagrammatic illustration of a two-component mixing and dispensing system incorporating a static mixer having one type of heating coil for performing the method of this invention.

Referring to FIG. 1, a preferred two-component system 10 for mixing and dispensing two different polymeric materials is illustrated. The detailed structure and operation of system 10, except as described below, form no part of this invention per se. For a detailed description of the entire system 10, reference should be made to U.S. patent application Ser. No. 07/690,060, filed concurrently herewith and entitled "Method and Apparatus For Metering Flow Of A Two-Component Dispensing System", which is owned by the assignee of this invention, and which is incorporated by reference in its entirety herein.

For purposes of discussing the method of this invention, the system 10 is described in connection with the dispensing of "hot melt" polymeric materials used in adhesive applications. "Hot melt" materials are those materials which are solid at room or ambient temperature but, when heated, are converted to liquid state. It should be understood that the system 10 and the methods of this invention are equally applicable for use in connection with the mixing and dispensing of cold materials, as well as materials other than adhesives such as paints, gasket materials and/or caulking materials.

The two-component mixing and dispensing system 10 comprises two hot melt applicators 12 and 14, two metering pumps 16 and 18, and a dispenser 20. Additionally, each metering pump 16 and 18 has a back pressure regulator in the form of a back pressure control means 22, 24, respectively.

In the embodiment of FIG. 1, the hot melt applicators 12 and 14 are two different types of applicators because of the different volume of material which each is required to melt and pump to the metering pumps 16 and 18 via the interconnecting conduits 26 and 28, respectively. The hot melt applicator 12 is operative to heat and supply under pressure from a pump contained internally of the applicator a first polymeric material which is utilized in less volume than the component supplied from the bulk hot melt applicator 14. One hot melt applicator 12 suitable for melting and pumping to the system the smaller volume polymeric component of this application is completely disclosed in U.S. Pat. No. 3,964,645 issued Jun. 22, 1976 and assigned to the assignee of this application. Similarly, a bulk melter 14 suitable for melting and supplying under pressure the main or high volume polymeric component utilized in this application is completely disclosed in U.S. Pat. No. 4,073,409 issued Feb. 14, 1978.

The metering pumps 16 and 18 may be gear-type, motor-driven pump operative to supply molten polymeric material via the conduits 26 and 28, respectively, to the dispenser 20. The volume at which each component is supplied to the dispenser is controlled by the speed of the motors 16a, 18a utilized to drive the gears 16b, 18b of the pumps 16 and 18, respectively. From the gear pump 16, the molten polymeric material derived from the hot melt applicator 12 is supplied to the dispenser 20 via a conduit 30 through an air-operated solenoid valve 32 of the dispenser 20. Similarly, from the metering pump 18, the main or high volume polymeric material is supplied via a conduit 34 to another air-operated solenoid valve 36 of the dispenser 20.

As shown in FIG. 1, these valves 32 and 36, in turn, are individually operable to control the flow of two different components into a mixing chamber 38 of the dispenser 20 where the two different materials are for the first time combined. From the mixing chamber, the two materials flow through a static mixer 40 having an outer wall 41 and an internal mixing element 43 of the type which is operative to repeatedly divide and recombine the mixture in the course of passage through the mixer 40 such that by the time the two components reach the discharge orifice 42 of the dispenser 20, the two components have been thoroughly mixed. A static mixer is illustrated in the Figs. for purposes of describing the purging operation of this invention, but it should be understood that the method and apparatus herein is equally applicable to other types of mixers including dynamic mixers.

In one presently preferred embodiment shown in FIG. 2, an electric resistance cable heater 45 is helically wound around the outer wall 41 of mixer 40 where it is permanently brazed into position using a high melting point brazing alloy (not shown). This cable heater 45 preferably includes an internal-type thermocouple connected by a thermocouple lead to a closed-loop feedback control which forms part of the "electrical control" indicated schematically at 75 in FIG. 1. Power leads and a ground line are also connected between the cable heater 45 and the electrical control 75. The thermocouple sends signals to the electrical control 75, as depicted in FIG. 2, which are correlated to the temperature of mixer 40 and are used to control the operation of cable heater 45.

Figure 7:
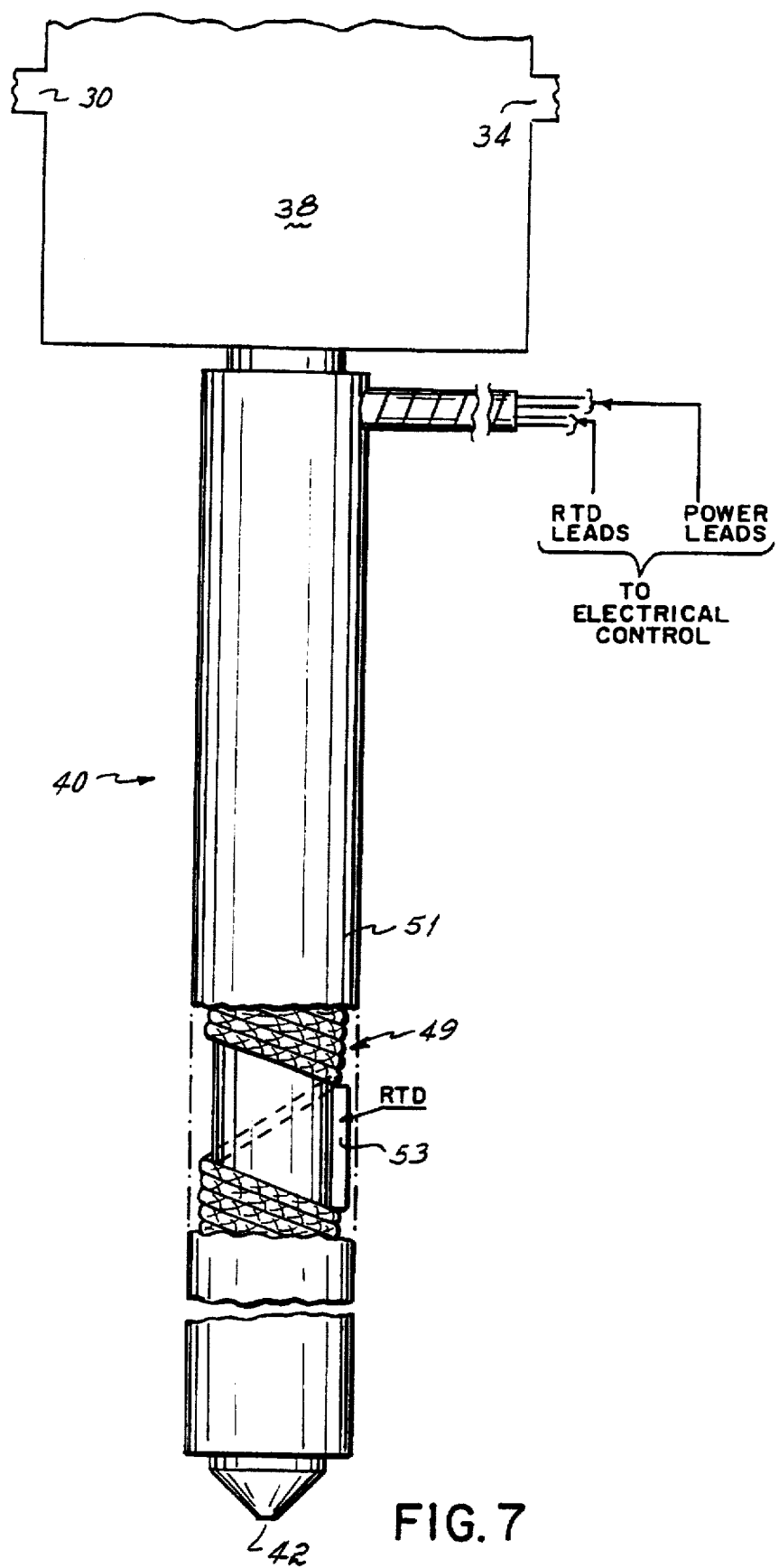
FIG. 7 is an elevational view of the mixer herein which is partially cut away to illustrate an alternative heating element.

In an alternative embodiment illustrated in FIG. 7, a heating coil 47 is wound around the outer wall 41 of mixer 40 and potted within an outer jacket 51. An RTD or other suitable temperature sensor 53 is mounted against the outer wall 41 of mixer 40 within the outer jacket 51 and is located in a space between the coils of the heating coil 47. The sensor 53 is connected to the electrical control 75 by "RTD leads" as shown in FIG. 7 for the same purpose as the thermocouple in the embodiment of FIG. 2 described above. Power leads are also connected between the heating coil 47 and electrical control 75.

A chemical reaction occurs between the two polymeric materials in the course of passage through the mixer 20, and continues after the components are dispensed from the outlet 42 thereof. In many applications, one component of the two-component system is a hardener which, when combined with the other component, causes that component to acquire its desired properties, as for example, in the case of a paint, a desired drying time, or in the case of a two-component adhesive, its quick setting and adhesive properties.

Each back pressure control means 22, 24 includes a bypass flow path 46, 48 around the gear pump 16, 18 with which it is associated. This bypass flow path comprises a flow conduit extending from the discharge side of the gear pump and its conduit 30, 34 to the input side of the gear pump and its input conduit 26, 28. Included in this flow path is a pneumatically operated flow control valve 52, 52' and an adjustable pressure regulator means 54, 54' connected in series in the bypass flow path. Additionally, each bypass flow path 46, 48 includes an overload pressure regulator in the form of a pressure relief valve 56, 56' connected in parallel with the flow control valve 52, 52' and adjustable pressure control means 54, 54' The function of the overload pressure relief valve 56, 56' is to bypass liquid from the discharge side of the metering pump to the inlet side in the event that the pressure on the discharge side of the metering pump exceeds a preset pressure substantially above the operating pressure at which the particular component is to be supplied from the metering pump 16, 18 to the dispenser 20.

Air pressure is supplied alternatively to the air-pressure-operated solenoids 32, 36 of the dispenser 20 and the pneumatically operated flow control valves 52, 52' of the back pressure control means 22 and 24. That is, when air pressure is supplied to the solenoids 32, 34 of the dispenser 20 so as to cause those valves to open and permit flow of liquid to the mixing chamber 38 of the dispenser, the flow control valves 52, 52' of the back pressure control means 22 and 24 are closed. Alternatively, when the flow control valves 52, 52' are open such that liquid can flow through the bypass flow paths, the solenoids 32, 36 are closed, and flow of liquid to the mixing chamber 38 is shut off.

In the operation of the system 10 illustrated in FIG. 1, the first or smaller volume component polymeric material is supplied in solid form to the hot melt applicator 12. In this example, this component is referred to as the smaller volume component but it could obviously be supplied at the same volume as the second component and still be within the practice of this invention. In the applicator 12, this material is melted and converted from the solid to the liquid state. This liquid smaller volume component, or component A, is supplied via a pump contained in the applicator 12 under pressure to the metering pump 16. The metering pump is operative to supply the molten liquid component A at a desired flow rate to the discharge side of the metering pump. Assuming that the flow control valve 32 of the dispenser 20 is closed, the output flow from the metering pump 16 is routed via the now open flow control valve 52 and pressure regulator means 54 in the bypass flow path 46, back to the input side of the gear pump 16. This bypass flow of component A will continue until the dispenser flow control valve 32 is opened. Similarly, the high volume or main component, component B solid material is melted by the bulk hot melt applicator 14 and is supplied under pressure from a pump contained internally of the bulk melter 14 to the metering pump 18. So long as the flow control valve 36 of the dispenser remains closed, that material continues to flow through the metering pump 18 and then through the bypass flow path 48, through the open flow control valve 52' and the pressure regulator means 54', back to the input side of the metering pump 18. When the flow control valves 32, 36 of the dispenser are opened, the flow control valves 52, 52' in the bypass flow paths around the metering pumps are simultaneously closed. Thereby, each component is permitted to flow from the metering pump via the conduits 30, 34 into the mixing chamber 38 of the dispenser 20 and through the mixer 40 to the discharge orifice 42 of the dispenser.

In accordance with the practice of one embodiment of this invention, the pressure of the smaller volume component A at the input side of the dispenser 20 is in the steady state flow condition of the dispenser when the two components are being mixed and dispensed through the dispenser 20. When the flow control valves 32, 36 of the dispenser 20 are closed and the flow control valves 52, 52' are open, the pressure regulator means 54, 54' are adjusted so as to maintain the pressure at the inlet to the dispenser at the same pressure as was recorded by pressure transducer and/or pressure readout gauges 60, 62 on the input sides of the dispenser 20 in the steady state flow condition, i.e., when the flow control valves 32, 36 of the dispenser were open and the flow control valves 52, 52' were closed.

In practice, the pressure regulator means 54, 54' may be either manually set and operated, or they may be automatically adjusted. If set manually, they will be adjusted so as to maintain a fixed pressure at the inlet side of the dispenser 20 (as read or pressure gauges or pressure transducers 60, 62) when the flow control valves 32, 36 of the dispenser are opened and the flow control valves 52, 52' of the back pressure control means 22, 24 are closed and vice versa. Alternatively, if operated automatically, the adjustable pressure regulator means 54, 54' may be adjusted by utilizing a closed loop control circuit, including a computer or programmable controller as part of the electrical control 75, to manipulate the adjustment of the pressure regulator means 54, 54' so as to maintain the input pressure to the dispenser at the same pressure after closing of the dispensing flow control valves 32, 36 as prevailed immediately prior to the closing of the flow control valves 32, 34. Preferably, in such an automatic control, the steady state pressure is determined for each cycle and the valves 54, 54' adjusted accordingly. This can be accomplished by utilizing pressure transducers for the gauges 60, 62 to provide input signals via lines 66, 68 to the electrical control 75. The pressure settings of the pressure regulator means 54, 54' may then be adjusted by the electrical control 75 acting on the pressure control means 54, 54' by signals transmitting via leads 71, 73.

Thus, the pressure reading at the pressure gauge or transducer 60 located at the inlet to the dispenser will be substantially the same pressure in both conditions of the dispenser, i.e., when the dispenser is operated so as to permit the two components to flow through the dispenser and when the flow control valves of the dispenser are closed and there is no material flowing through the dispenser. Similarly, the pressure reading at the pressure transducer or gauge 62 located at the inlet to the dispenser will read substantially the same pressure in both conditions of the dispenser 20, i.e., when the dispenser is operated so as to permit the two components to flow through the dispenser and when the flow control valves of the dispenser are closed and there is no material flowing through the dispenser.

With reference to FIGS. 2 and 3, component A from the hot melt applicator 12 and component B from the hot melt applicator 14 flow through valves 32, 36, respectively, into the mixing chamber 38 of dispenser 20. This mixing chamber 38 is located at the entrance to the interior 49 of the static mixer 40 upstream from the internal mixing element 43. As mentioned above, the internal mixing element 43 is operative to repeatedly divide and recombine the components A and B so that they are thoroughly mixed when they reach the discharge orifice 42. As shown in FIG. 3, when the static mixer 40 first begins operation, the intermixed components A and B flow through essentially clear, unobstructed flow paths 72 and 74 defined by the spiral-shaped, internal mixing element 43 of the static mixer 40. Over a period of time, and particularly where the system 10 is operated intermittently, components A and B chemically react with one another within the interior 49 of static mixer 40 and at least partially cure therein to form a mixture of increased viscosity. One aspect of this invention is a method for periodically flushing or purging the partially cured mixture of components A and B from the mixer interior 49 to delay the onset of the formation of a layer of cured material 76 of the type shown in FIG. 4 and discussed below.

In the presently preferred embodiment, the flushing or purging of the partially cured mixture of components A and B is accomplished as follows. The low volume flow from hot melt applicator 12 is first discontinued by either shutting off the gear pump 16 or bypassing flow from the conduit 30 by operation of the flow control valve 52 in the manner described above. Having cut off the flow of component A through conduit 30, the high volume flow of component B through conduit 34 is utilized to purge or flush the mixer interior 49. Flow of this component B into the static mixer 40 is accomplished as described above, except that such flow is preferably pulsed or intermittently interrupted such as by turning on and off the metering gear pump 18, or by alternately directing the flow of component B into the bypass flow path 48 instead of through conduit 34 as described above. In either case, the flow of component B through conduit 34 into the interior 49 of static mixer 40 is preferably allowed to proceed for a predetermined interval, such as about two seconds, and then is discontinued for a predetermined time interval such as about two seconds, so that a pulsed flow of component B is introduced into the mixer interior 49.

It has been found that the pulsed or intermittently interrupted flow of component B or other purging material into the mixer interior 49 effectively flushes away at least a portion of the mixture of components A and B residing within the mixer 40 which has partially cured. It is believed that the pulsed flow of component B into the mixer 40 has the effect of increasing the "effective viscosity" of such material, which, in turn, increases the shear force which the component B flushing material applies to the partially cured mixture within the mixer interior 49. After being injected into the static mixer 40 for a period of about two seconds, it is believed that the flushing material stops or at least slows down during the following two second period when the flow is discontinued. This slowing or stoppage of the movement of component B within the mixer interior 49 increases its effective viscosity. When a new pulse or flow of component B is then introduced into the mixer interior 49, the component B flushing material previously introduced into the mixer 40 is pushed forwardly, and, because of its high effective viscosity, imposes a comparatively high shear force on at least a portion of the partially cured mixture of components A and B in the mixer interior 49. The pulses of the component B flushing material are continued for a sufficient period of time to force at least a portion of the partially cured mixture of components A and B from the mixer interior 49 through the discharge outlet 42. For example, the above-described purging operation has been successfully conducted over a time period on the order of about 30 seconds, or until about one-tenth to one-eighth of a pound of component B has been flushed through the mixer 40. When the operation of system 10 is resumed, the mixer 40 is effectively cleared of at least some of the partially cured mixture of components A and B which had been building up therein.

It is recognized that even with the purging operation described above, wherein a pulsed flow of component B or other purging material is introduced into mixer 40, the inner surface of the mixer wall 41 and the surfaces of the internal mixing element 43 nevertheless eventually become covered with a layer of deposited material which is believed to be cured material 76, or possibly a combination of cured and uncured material. As viewed in FIG. 4, this phenomenon is analogous to arteriosclerosis in human arteries where a layer builds on the inner walls and restricts the flow of blood. In the system 10 herein, the mixture of components A and B cannot be prevented from curing within the static mixer 40 and it gradually begins to form the layer of deposited or cured material 76 on the internal walls of the mixer 40. As used herein, the term "walls" is meant to refer to both the inner surface of outer wall 41 and the surfaces of internal mixing element 43.

Once some of the deposited or cured material forms on the mixer walls, the mixture of components A and B which is subsequently introduced into the mixer 40 tends to continue to build up along the walls. This is because the velocity profile of the mixture within the flow passages 72, 74 is such that the material at the center of the passages 72, 74 has the highest velocity, while that portion along the walls has a velocity approaching zero which allows it to be deposited with the material already present on the mixer walls. As a result, the layer of cured material 76 gradually continues to increase in thickness until the flow passages 72 and 74 through the mixer interior 49 become so clogged and restricted that little flow can be obtained through the mixer 40 and/or the components A and B are ineffectively mixed together. This condition can be determined by sensing the pressure across the static mixer 40 with a pressure sensor 77 of any commercially available type.

When the condition of the interior 49 of the static mixer 40 is at a point such as illustrated in FIG. 4, and the pressure drop across the mixer 40 reaches a predetermined upper limit, the second aspect of the method of this invention is employed to remove the layer of cured material 76 from the mixer walls. Initially, the flow of both components A and B to the mixer 40 is discontinued either by shutting off metering pumps 16, 18 or recirculating their flow through bypass flow paths 46, 48, in the manner discussed above. The cable heater 45 or heating coil 47 is then energized to apply heat to the outer wall 41 of mixer 40. Preferably, the cable heater 45 or heating coil 47 is operated by the electrical control 75 at a temperature in excess of the application temperature of components A and B, but less than their decomposition temperature. Because the outer wall 41 and internal mixer element 43 of the mixer 40 are preferably formed of stainless steel, or other suitable thermally conductive metallic material, the heat from cable heater 45 of heating coil 47 is quickly and efficiently transferred to all of the walls of the mixer 40.

The walls of mixer 40 therefore become heated much more quickly than the layer of cured material 76 adhered thereto. This is because such walls are much more thermally conductive than the polymeric components A and B forming the layer of cured material 76. As a result, those portions of the layer of cured material 76 which contact either the inner surface of outer wall 41 or the internal mixing element 43 of mixer 40 are quickly elevated to a relatively high temperature, whereas the inner portions of the layer of cured material 76 remain at a lower temperature. Having elevated the temperature of the portions of cured material 76 which contact the mixer walls, the shear strength of such material thereat decreases proportionately and this reduces the bond or force with which the layer of cured material 76 attaches to the mixer walls.

Once the desired temperature within the mixer is obtained for a period sufficient to reduce the shear strength or force of adherence of the layer of cured material 76 to the mixer walls, a flow of flushing or purging material is introduced into the mixer interior 49. Preferably, the flow of component B into the mixer 40 is resumed at high hydraulic pressure and at a normal application temperature to accomplish the flushing operation. The hydraulic pressure at which the component B enters the mixer 40 varies in accordance with the extent of the restriction of the flow passages 72 and 74 caused by the layer of cured material 76. The component B is introduced at a constant flow rate, e.g., about 10 pounds per hour, and when it initially enters mixer 40, the hydraulic pressure is relatively high, e.g., on the order of about 1800 psi. This pressure then decreases to levels on the order of about 200 psi as cured material exits the mixer 40, with component B being supplied at constant flow rate.

As viewed in FIGS. 5 and 6, the flow of flushing material such as component B is effective to first dislodge the layer of cured material 76 from the outer wall 41 and internal mixing element 43 of mixer 40. The layer of cured material 76 fails or breaks away at the mixer walls, instead of at another location along the thickness of such layer of cured material 76, because of the aforementioned reduction of shear strength of the layer of cured material 76 at the mixer walls. Additionally, the relatively low temperature component B has a high effective viscosity when introduced into the mixer 40 which maximizes the shear force which component B applies to the layer of cured material 76.

After the layer of cured material 76 is broken away from the mixer walls, the component B flushing material transmits the cured material 76 as a slug through the mixer 40 and out its discharge outlet 42. See FIG. 6. Upon completion of this flushing or purging operation, the temperature of the mixer 40 is allowed to return to a normal level and resumption of operation of the system 10 can then proceed.

EXAMPLE

One example of the flushing or purging operation described above is given below in which a layer of cured material 76 is successfully removed from the interior of mixer 40.

| Materials | |
| --- | --- |
| Component A: | HL-9601-B |
| Component B: | HL-9602-A |
| | H.B. Fuller |
| | St. Paul, MN |
| Static Mixer: | Series No. 100 |
| | Tah Industries, Inc. |
| | Imlaystown, NJ |
| Temperature of Purge Material: | 300–350° F. |
| Temperature of Heating Coil: | 650–800° F. |
| Hydraulic Pressure of Purge Material: | 200–1,800 psi |
| Flow Rate of Purge Material: | 10 pounds per hour |
| Duration of Flow of Purge Material: | about 15–30 seconds |

Under the operating conditions and with the materials as set forth above, a layer of the cured mixture of the above materials is removed from the mixer 40.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, while the operation of the method herein has been described with reference to components A and B as being hot melt polymeric materials, it should be understood that such method is equally applicable to other materials and can be used in dispensing systems other than that described above.

Therefore, it is intended that the invention not be limited to the particular embodiment disclosed as the best mode contemplated for carrying out this invention, but that the invention will include all embodiments falling within the scope of the appended claims.

We claim:

1. An on-line method of mixing and dispensing reaction curable material at an application temperature from a heated mixer, and of delaying the onset of clogging of the mixture and of clearing the mixer of cured material buildup within the mixer, including the on-line steps in combination of:

introducing at least two heated mixable components under pressure at a predetermined ratio into a mixer;

flowing said components through said mixer with said components mixing and reacting to form a curable material having portions at least partially curing therein;

dispensing heated material at an application temperature from said mixer;

periodically stopping the flow of one of said components into said mixer;

intermittently pulsing a flow of another component therethrough so that the rate of flow of said other component varies and thereby delaying the accretion of partially cured material on walls of the mixer;

resuming said dispensing;

sensing a pressure drop across a portion of said mixer indicative of a buildup of at least partially cured material on mixer walls despite said intermittent pulsing; and (i) in response to such pressure drop elevating the temperatures of the walls of said mixer from an operating temperature to a predetermined temperature above said application temperature and below a decomposition temperature of said material and thereby creating a temperature gradient across said partially cured material thereby reducing the shear strength of said material at said mixer wall, while the temperature of said partially cured material spaced from said walls is less than said predetermined temperature;

(ii) introducing one of said components to said mixer at a temperature less than said pre-determined temperature and at a hydraulic pressure sufficient to dislodge the at least partially cured material from the mixer walls and to transfer such dislodged material out of said mixer, the dislodging of such material from said walls being a function of the decreased shear strength of partially cured material at said wall, the relatively higher shear strength of partially cured material spaced from said wall and the flow of said one component acting on said at least partially cured material and;

(iii) continuing said introduction of said two components and said flowing, dispensing and intermittent pulsing steps.

2. The method of claim 1 in which said step of heating the mixer comprises heating the walls of the mixer at an operating temperature of about 300° F. to a pre-determined temperature in the range of about 600°–800° F.

3. The method of delaying the clogging of a curable material mixer and of purging the mixer of cured and partially cured material produced by the chemical reaction of two or more components within the mixer, comprising:

operating the mixer to mix and dispense curable material;

introducing a flow of purging material into the mixer and in contact with partially cured material therein;

intermittently interrupting said flow of purging material into the mixer to cause the purging material within the mixer to exert an increased shear force against the partially cured material therein and thus aid in the removal of the partially cured material from the mixer, thereby delaying clogging of the mixer;

sensing the presence of cured material by a sensor within the mixer tending to clog the mixer;

heating the mixer, in response to said sensing the presence of cured material therein, to a temperature below the decomposition temperature of said material and above a material application temperature and creating a temperature gradient across the partially cured material on the walls of said mixer such that the shear strength of the cured material at the walls of the mixer is reduced;

introducing a purging material into the mixer at sufficient hydraulic pressure to dislodge the cured material from the mixer walls and transmit such cured material out of the mixer, thereby to unclog the mixer; and resuming said operating step.

4. An on-line method of mixing and dispensing different component materials which react chemically with one another when combined, comprising the steps of:

supplying a flow of a first pressurized heated liquid component material to a dispenser;

supplying a flow of a second pressurized heated liquid component material to the dispenser;

heating a mixer carried by the dispenser to an operating temperature;

mixing the first and second heated component materials within said mixer carried by the dispenser;

dispensing the resultant curable mixture therefrom;

periodically interrupting the flow of the first component material to the dispenser while causing the flow of the second component material to be pulsed, the pulsed flow of the second component material dislodging partially cured mixture from the mixer;

dispensing the second component material and the dislodged partially cured mixture;

resuming the normal flow of both component materials within the mixer; and upon sensing a pressure drop across the mixer as a function of the presence of deposited mixture on the walls within the mixer, (i) interrupting the flow of the component materials;

(ii) heating the mixer to a pre-determined temperature above the operating temperature to reduce the adhesion of the deposited mixture on walls of the mixer;

(iii) resuming the flow of the second component material at a temperature lower than said predetermined temperature, to the dispenser to dislodge and transport the mixture from the walls of the mixer;

(iv) dispensing the second component material and the dislodged mixture therefrom and;

(v) resuming said dispensing.

5. A method as in claim 4 wherein the pressure of the second component material in the mixer is maintained between 200 and 1800 psi.

* * * * *